(12) United States Patent
Sans

(10) Patent No.: US 6,256,575 B1
(45) Date of Patent: Jul. 3, 2001

(54) PROCESS FOR CONTROLLING AN INTERNAL COMBUSTION ENGINE

(75) Inventor: Mariano Sans, Blagnac (FR)

(73) Assignee: Siemens Automotive S.A., Toulouse Cedex (FR)

( * ) Notice: Subject to any disclaimer, the term of this patent is extended or adjusted under 35 U.S.C. 154(b) by 0 days.

(21) Appl. No.: 09/391,548

(22) Filed: Sep. 8, 1999

(30) Foreign Application Priority Data

Sep. 8, 1998 (FR) .................................................. 98 11178

(51) Int. Cl.$^7$ .............................. F02D 43/04; F02D 41/14
(52) U.S. Cl. ............................................................ 701/102
(58) Field of Search .................................... 701/102, 101, 701/114, 115

(56) References Cited

U.S. PATENT DOCUMENTS

| 5,121,820 | * | 6/1992 | Brown et al. | 701/105 |
| 5,190,020 | * | 3/1993 | Cho | 123/478 |
| 5,379,741 | * | 1/1995 | Matysiewicz et al. | 123/497 |
| 5,527,238 | * | 6/1996 | Hrovat et al. | 477/166 |

* cited by examiner

Primary Examiner—Henry C. Yuen
Assistant Examiner—Hieu T. Vo
(74) Attorney, Agent, or Firm—Herbert L. Lerner; Laurence A. Greenberg; Werner H. Stemer

(57) ABSTRACT

A process for controlling an internal combustion engine (1), whereby a set of set-point values (y_sp) of output variables (y) of the engine is determined. These set-point values are applied to an inverse model ($M^{-1}$) of the engine produced from the iterative exploitation of a loop with a direct model (M) of the engine and a correction matrix ($J^{-1}$) for correcting the inputs of the direct model as a function of its outputs. The result is that a set of commands (u) that can be applied to means (11) for adjusting the engine is obtained.

10 Claims, 2 Drawing Sheets

PROCESS FOR CONTROLLING AN INTERNAL COMBUSTION ENGINE

BACKGROUND OF THE INVENTION

1. Field of the Invention

The present invention relates to a process for controlling an internal combustion engine and, more specifically, to a process using a model of the engine to define the commands to be applied in order to obtain a desired result.

Modern techniques for controlling internal combustion engines of motor vehicles place increasing reliance on mathematical modeling of the engines to produce more robust control processes capable of more accurately taking account of requirements imposed by drivers of the motor vehicles and of the constraints imposed by pollution-control regulations. Mathematical models enable output variables y of an engine to be estimated using a set of commands u that is input to the engine. For example, the model depicted in block form in FIG. 1, enables a set of commands u such as the set formed by the throttle position TPS, the position EGRV of an exhaust gas recirculation valve, the ignition advance IGA, the amount INJ of the fuel injected, etc., to be used to estimate output variables y of the engine such as the torque TQ supplied, the amount of air drawn in MAF, the richness LAM of the exhaust gases, and their recirculation rate EGR. These output variables cannot always be measured directly and economically on an actual engine.

FIG. 2 depicts, in simplified form, a known process for controlling an internal combustion engine. Such a process is known, for example, from French patent application 9700648 filed by the assignee of the present application. A set-point torque TQ_SP is determined by evaluating the depression of a throttle pedal. A set of commands u to be applied to means 11 for adjusting the engine 1 is determined by applying the set-point torque TQ_SP to an inverse model $M^{-1}$ of the engine. Other set points LAM_SP and EGR_SP that might be present can also be applied to the inverse model. However, an inverse model of this kind needs to be obtained by an analytical inversion of the direct model M shown in FIG. 1, which, in the case of multi-variable models (multiple inputs and multiple outputs) is an extremely complex operation. Furthermore, the various coefficients of the analytical equations that form the direct model are generally obtained experimentally by identifying the model with the actual engine. The coefficients are stored in numerous mapping tables. When the direct model is inverted, these tables have to be inverted and, given the non-linearity of the coefficients, this often leads to indeterminacy or inaccuracies which are prejudicial to the effectiveness of the control process. Furthermore, any modification to the direct model, even to just one coefficient, necessitates a further complete inversion of the model. Thus development and optimization is extremely lengthy and expensive.

SUMMARY OF THE INVENTION

The object of the present invention is therefore to propose an internal combustion engine management process which, while retaining the advantages of the processes of the prior art, does not display the difficulties associated with inverting the used models.

With the foregoing and other objects in view there is provided, in accordance with the invention, a process for controlling an internal combustion engine, which includes: determining a set of set-point values of output variables of an engine; implementing a mathematical loop including a direct model of the engine and a correction matrix for correcting inputs of the direct model as a function of outputs of the direct model; determining an inverse model of the engine by iteratively using the loop; and obtaining a set of commands to be applied to means for adjusting the engine by applying the set of the set-point values to the inverse model of the engine.

In accordance with an added feature of the invention, the process includes: supplying a set of initial commands to the direct model of the engine; obtaining a difference vector by comparing an estimate of output variables supplied by the direct model with the set of set-point values; processing the difference vector with the correction matrix to obtain a correction vector; and summing the correction vector with the set of initial commands to obtain a set of commands for application to the means for adjusting the engine.

In accordance with addition features of the invention, a set of set-point values of output variables of the engine is determined. These set-point values are applied to an inverse model of the engine and a set of commands are obtained that can be applied to means for adjusting the engine. The inverse model of the engine is produced from an iterative exploitation of a loop with a direct model of the engine and a correction matrix for correcting the inputs of the direct model as a function of its outputs.

According to the process that is the subject of the invention, a set of initial commands is supplied to the direct model of the engine. The estimate of the output variables which is supplied by the model is compared with the set of set-point values and a difference vector is obtained from this comparison. The difference vector is processed using the correction matrix to obtain a correction vector for correcting the commands, and the correction vector is summed with the set of initial commands to obtain the set of commands to apply to adjusting means.

In accordance with further features of the invention, the above steps are repeated with a predetermined temporal recurrence, using, on each iteration, the set of commands obtained in the previous iteration as the set of the initial commands. In a second implementation of the process, a series of iterations is triggered each time the engine reaches top dead center. The successive correction vectors are integrated, and the set of commands is applied to the adjusting means only when the relative difference vector is below a predetermined threshold. In this last implementation, each time the engine reaches top dead center, the set of commands applied at the previous top dead center is used as the set of initial commands.

In accordance with further added features of the invention, the correction matrix is obtained by the inversion or pseudo-inversion of the Jacobian matrix of the partial derivatives of the output variables of the engine with respect to the commands. Advantageously, the influence of slowly-varying parameters is neglected when calculating the coefficients of the Jacobian matrix, and the direct model receives a state vector representing the current operating conditions of the engine. The state vector can include parameters that are measurements of current operating conditions.

In accordance with a further additional feature of the invention, a first alternative form is provided wherein the correction matrix is determined experimentally during engine development testing and its coefficients are stored in a table as a function of the operating conditions of the engine.

In accordance with a concomitant feature of the invention, there is provided a second alternative form wherein the Jacobian matrix is determined during each iteration from an estimate of the partial derivatives which is drawn from the calculation of the variation of the outputs of the direct model as a function of a unit variation in one of its inputs about the current operating point.

Other features which are considered as characteristic for the invention are set forth in the appended claims.

Although the invention is illustrated and described herein as embodied in a process for controlling an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
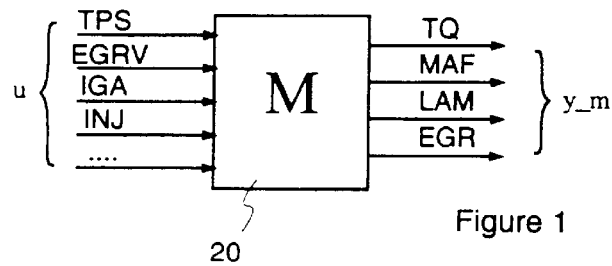
FIG. 1 depicts an engine model commonly used in the prior art.
Figure 2:
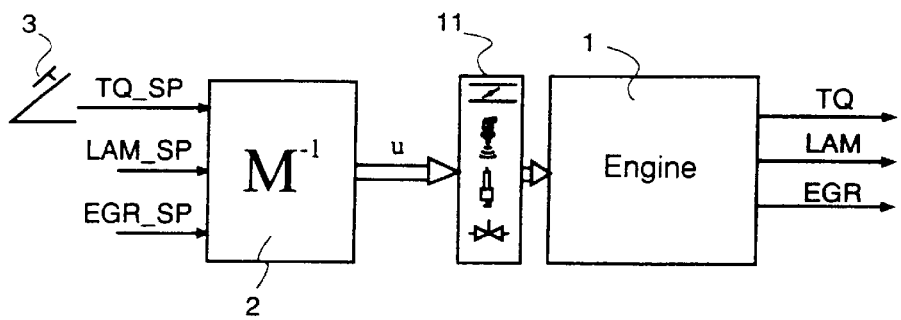
FIG. 2 depicts an example of a control process known in the prior art.

Referring now to the figures of the drawings in detail and first, particularly, to FIG. 1 thereof, there is seen an internal combustion engine model M that is a set of equation which is generally non-linear. A set of commands u representing the commands applied to various actuators such as a throttle valve or a fuel injector is applied to the model M as an input. From this set of commands, the model M calculates and updates internal state variables (not depicted) such as the engine speed or the inlet manifold pressure, and supplies an output representing an estimate y_m of output variables such as the torque supplied TQ, the amount of air drawn in MAF, the combustion richness LAM, and/or the exhaust gas recirculation rate EGR. These estimates are used, for example, to evaluate output variables that cannot be measured directly. This model is also used in its inverse form $M^{-1}$ (FIG. 2) to determine the set of commands u to be applied to an adjusting means 11 to obtain output variables of the engine 1 which correspond to a set of set-point values y_sp.

Figure 3:
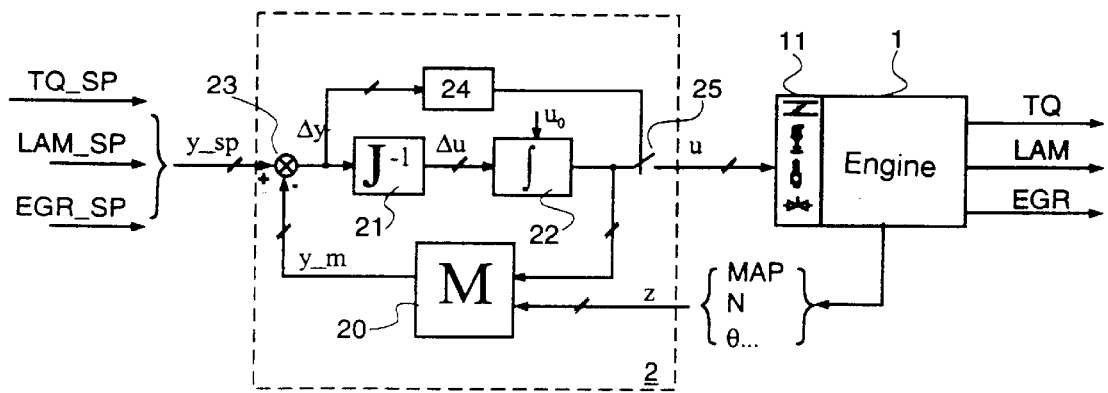
FIG. 3 depicts a block diagram of the control process according to the invention.
Figure 5A:
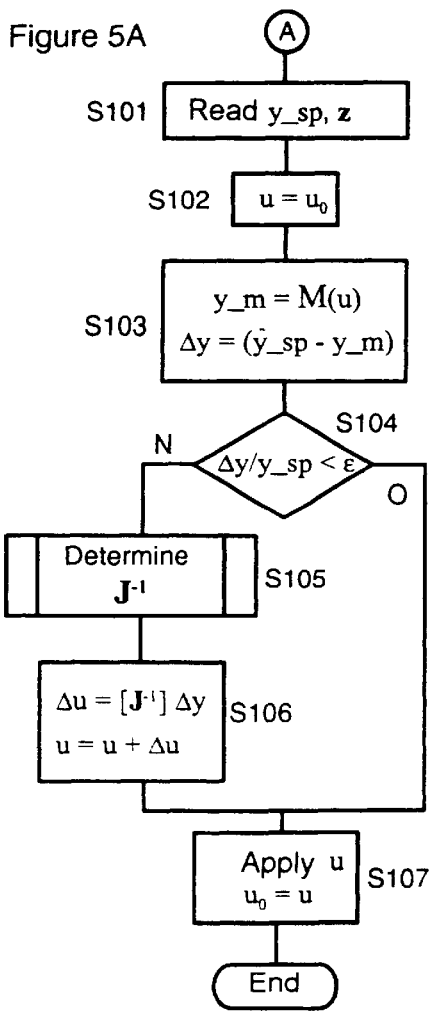

Reference is now made to FIG. 3 which depicts the control process according to the invention in the form of a block diagram. A set of set-point values y_sp containing, for example, set-point values for torque TQ_SP), richness (LAM_SP and exhaust gas recirculation rate (EGR_SP) is supplied to a block 2 for applying the inverse model $M^{-1}$, depicted in the broken-line box. This block 2 contains a block 20 for applyin a direct model M of the engine 1 which receives a state vector z representing the current operating conditions of the engine 1. This state vector consists, for example, of measurements made in real time on the engine, such as the manifold pressure MAP, the rotational speed N, the coolant temperature θ, etc. Use of this state vector advantageously allows the use of a simplified model M and/or allows its divergence to be limited. The block 20 also receives a set of commands u produced by an integration block 22 which will be described later on. On the basis of the set of commands u and of the state vector z, the direct model M of the block 20 supplies an estimate y_m of the output variables of the engine. This estimate is compared with the set of set-point values y_sp in a summer 23 to form a difference vector Δy. This difference vector is then supplied to a block 21 for calculating and applying a correction matrix $J^{-1}$, the detailed operation of which will be explained later in conjunction with FIGS. 5 and 6. The block 21 supplies the integrator block 22 with a correction vector Δu to be applied to the set of commands u. The successive correction vectors Δu are integrated by the integration block 22, starting from a set of initial commands $u_0$, to obtain a set of commands u capable of minimizing the difference vector Δy. It can be see that a loop is produced, and iteratively using the loop enables one starting with a set of set-point values y_sp, to define a set of commands u that can be applied to the adjusting means 11 of the engine 1, without necessitating analytical inversion of the model M of the engine 1. FIG. 3 also depicts a comparator block 24 which receives the difference vector Δy and controls a switch 25, thus making it possible for the set of commands u to be transmitted to the adjusting means 11 only under certain conditions. These two elements are optional and are used only in a second implementation of the process which will be detailed below.

Figure 4:
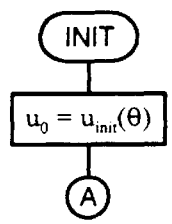
FIGS. 4 to 6 depict operational flow charts of the control process according to the invention.

In a first implementation of the process, the loop described above is executed with a predetermined temporal recurrence so that it is out of synchronization with the operating cycle of the engine 1. The set of commands u at the output from the integration block 22 is constantly transmitted to the adjusting means 11. When the engine 1 starts, the process goes through an initialization phase according to the process described in FIG. 4. This is because it has been observed that the engine starting conditions depend essentially on its temperature which can be advantageously measured by measuring the coolant temperature θ. When a computer designed to apply the inventive process is switched on, the computer measures the temperature θ and determines, from a table defined by earlier testing and which is stored in the computer, a set of commands $u_{init}(θ)$. The set of commands $u_{init}(θ)$ can include, for example, a throttle valve position, an amount of fuel to be injected, an ignition advance, etc. This set of commands is applied to the adjusting means 11 and is considered as being a set of initial commands $u_0$. The next step is step S101 of FIG. 5A in which the set of set-point values y_sp and the state vector z are read. In step S102, the value of the set of initial commands u0 is assigned to the current set of commands u, and in step S103, the estimate of the output variables y_m is calculated by applying the set of commands u to the model M. The difference vector Δy is also formed by determining the difference between the set of set-point values y_sp and the estimate y_m obtained. In step S104, a test is applied to determine whether the relative difference vector Δy/y_sp is below a predetermined set of values ε to check whether the set of commands u is able to supply the desired result. It will, however, be noted that this test is optional and is intended only to avoid steps S105 and S106 if the result is positive in order to save on calculation time. If this test is not performed or if the result of the test is negative, the correction matrix is then determined in step S105.

The correction matrix $J^{-1}$ consists of coefficients which determine the direction and intensity of the variation that has to be applied to each element of the set of commands u to obtain a predetermined variation in each of the output variables y for each engine operating point. To determine these coefficients, the starting point is to determine the Jacobian matrix J or the matrix of partial derivatives of the system consisting of the engine 1 and the adjusting means 11 by applying a unit variation to each command $u_i$ of the set of commands u and observing the variation induced in the output variables y. Because a physical process is represented, this Jacobian matrix is regular and can be inverted (if the matrix is square, i.e. if the number of input commands is equal to the number of observed output variables) or "pseudo-inverted" using one of the formulas:

$$J^{-1}=J^T\cdot[J\cdot J^T]^{-1}\text{(number of inputs>number of outputs)}$$

or $$J^{-1}=[j^Tj]^{-1}\cdot J^T\text{(number of inputs<number of outputs)}.$$

The formula selected depends on the respective number of input commands and output variables in the direct model in question. In each formula $J^T$ is the transpose of the matrix J. This enables the determination of the correction matrix $J^{-1}$.

In a first alternative form of the process, the coefficients of the correction matrix are obtained experimentally during engine development testing. These coefficients are then stored in memory in tables as a function of the engine operating conditions, for example as a function of the inlet manifold pressure MAP and rotational speed N, these being essential elements of the state vector z. In this alternative form, the coefficients of the correction matrix $J^{-1}$ are extracted from the tables as a function of the values of the state vector during step S105.

Figure 6:
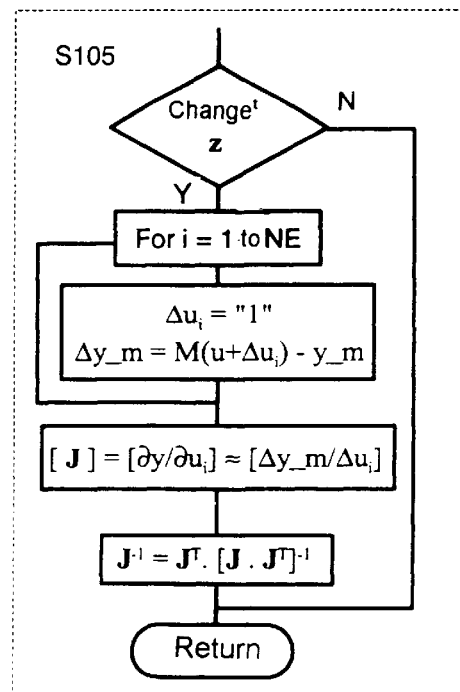

In another alternative form, depicted in FIG. 6 as a subroutine called by step S105, use is made of an estimate of the partial derivatives which is obtained from the direct model M so that the correction matrix can be determined by calculation. The starting point is to check whether the engine operating conditions represented by the state vector z have changed. If they have not, the correction matrix calculated earlier still applies and the subroutine is exited. If a change of state has occurred since the previous pass, the process enters a loop where a unit variation $\Delta u_i$ is applied to each command and the direct model M is used under the conditions set by the state vector z to calculate a variation $\Delta y\_m$ in the estimate of the output variables. The Jacobian matrix J is then constructed from the relative variations $\Delta y\_m/\Delta u_i$ and is then inverted using one of the formula described earlier to obtain the correction matrix $J^{-1}$.

Advantageously, to reduce the amount of memory needed in the first alternative form or the calculation time in the second alternative form, the determination of the coefficients of the correction matrix is restricted to the essential controllable modes. That is to say modes which have a decisive influence over the output variables. Likewise, the influence of these coefficients of slowly-varying parameters such as the engine temperature $\theta$ for example, will be neglected. These parameters are therefore taken into account through the state vector z supplied to the direct model.

Returning to FIG. 5A, in step S106, the difference vector $\Delta y$ calculated in step S103 and the correction matrix $J^{-1}$ of step S105 are used to determine a correction vector $\Delta u$ which is summed using the integration block 22 of FIG. 3 with the current set of commands to obtain a new set of commands u. This set of commands is then applied to the engine adjusting means 11 in step S107 and stored in memory to serve as a set of initial commands $u_0$ out in the next iteration. As was seen earlier, in this implementation of the process, these iterations are triggered with a predetermined temporal recurrence in such a way that they are out of synchronization with the engine combustion cycle.

Figure 5B:
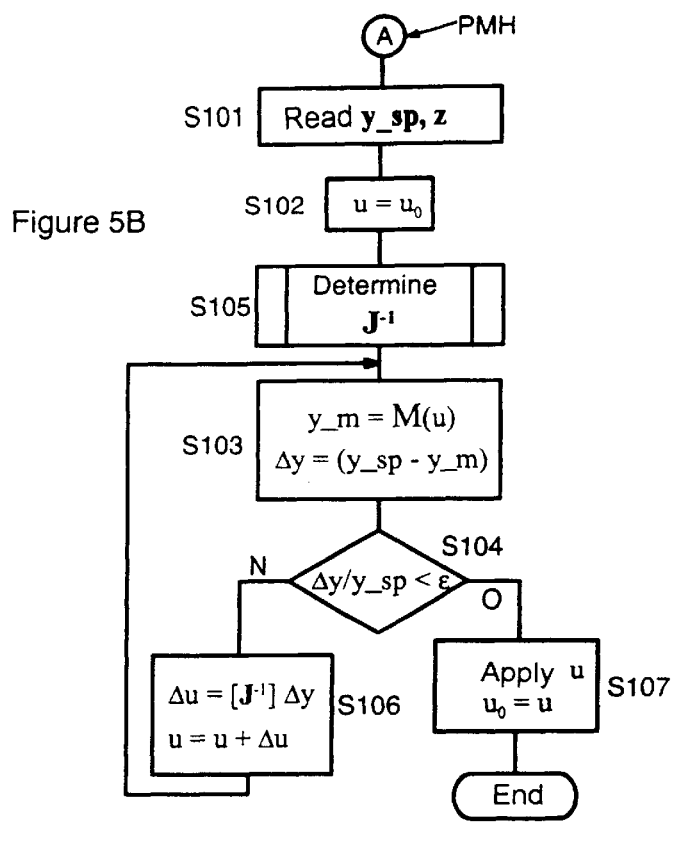

In a second implementation of the process, an iterative calculation of the set of commands u to be applied is triggered each time the engine reaches top dead center. Reference is made to FIG. 5B which depicts a flow chart for this implementation. It will be noted that only the sequence of the steps of the process differ from FIG. 5A. The steps themselves remain essentially identical to those of FIG. 5A, and will therefore be identified in the same way. After starting the engine during initialization, which is performed in accordance with FIG. 4 that has already been described, each top dead center (TDC) of the engine triggers the reading of the set of set-point values y_sp and state vector z (S101). Each top dead center (TDC) of the engine also triggers the initialization of the current set of commands with the set of initial commands which was determined at the previous TDC (S102), and the determination of the correction matrix $J^{-1}$ (S105) which is performed according to any one of the alternative forms described in conjunction with the first implementation. Step S103 is then carried out, in which an estimate y_m of the output variables is determined by applying the current set of commands u to the model M and a difference vector $\Delta y$. The relative difference vector $\Delta y/y\_sp$ is then compared with a predetermined set of threshold values $\epsilon$. If the relative difference vector $\Delta y/y\_sp$ is not below the set of threshold values $\epsilon$, then in step S106, a correction vector $\Delta u$ is calculated for correcting the set of commands by applying the difference vector $\Delta y$ to the correction matrix $J^{-1}$. This correction vector is integrated into the set of commands so that a new set of commands u which will be sent on to step S103 can be obtained from this. This process of successive iteration and integration of the correction vectors is continued until the test at step S104 becomes positive. When this happens, the process moves on to step S107 in which the set of commands u obtained is applied to the adjusting means 11 and is stored in memory to act as a set of initial commands $u_0$ in the cycle triggered by the next passage through TDC.

Of course, the invention is not restricted to the implementations described hereinabove, which have been given merely by way of examples. The two implementations could also be combined, depending on the calculation time available, using the second at low speed when the time between two passages through TDC is long, and the first at high speed. Likewise, the correction matrix could be determined initially on the basis of engine testing and then refined through a learning process using the values calculated from the model.

I claim:

1. A process for controlling an internal combustion engine, which comprises:
   determining a set of set-point values of output variables of an engine;
   implementing a mathematical loop including a direct model of the engine and a correction matrix for correcting inputs of the direct model as a function of outputs of the direct model;
   determining an inverse model of the engine by iteratively using the mathematical loop; and
   obtaining a set of commands to be applied to means for adjusting the engine by applying the set of the set-point values to the inverse model of the engine.

2. The process according to claim 1, which comprises:
   supplying a set of initial commands to the direct model of the engine;
   obtaining a difference vector by comparing an estimate of output variables supplied by the direct model with the set of set-point values;

processing the difference vector with the correction matrix to obtain a correction vector; and summing the correction vector with the set of initial commands to obtain a set of commands for application to the means for adjusting the engine.

3. The process according to claim 2, which comprises:

iteratively repeating the steps defined in claim 2 with a predetermined temporal recurrence; and using the last set of commands for application to the means for adjusting the engine as the set of initial commands supplied to the direct model in a subsequent iteration.

4. The process according to claim 2, which comprises:

triggering a series of iterations of the steps defined in claim 2 each time the engine reaches top dead center;

integrating successive correction vectors; and applying the set of commands to the means for adjusting the engine only when the difference vector is below a predetermined threshold value.

5. The process according to claim 4, which comprises each time the engine reaches top dead center, using a set of commands applied at the previous dead center as the set of initial commands.

6. The process according to claim 2, which comprises obtaining the correction matrix by inverting or pseudo-inverting a Jacobian matrix of partial derivatives of the output variables of the engine with respect to the commands.

7. The process according to claim 6, which comprises:

calculating coefficients of the Jacobian matrix by neglecting an influence of slowly-varying parameters;

forming a state vector representing current operating conditions of the engine; and applying the state vector to the direct model.

8. The process according to claim 6, wherein the step of obtaining the correction matrix includes experimentally determining coefficients of the correction matrix during engine development and testing, and storing the coefficients in a table as a function of operating conditions of the engine.

9. The process according to claim 6, which comprises:

determining an estimate of the partial derivatives from calculating a variation of the outputs of the direct model as a function of a unit variation in one of its inputs about a current operating point; and determining the Jacobian matrix during each iteration from the estimate of the partial derivatives.

10. The process according to claim 2, which comprises determining the set of initial commands as a function of an engine temperature when the engine is starting.

* * * * *